United States Patent Office 2,884,442
Patented Apr. 28, 1959

2,884,442
β-AMINOPROPIONITRILE FUMARATE

Raymond J. Michaels, Jr., Mundelein, and Marvin A. Spielman, Waukegan, Ill., assignors to Abbott Laboratories, North Chicago, Ill., a corporation of Illinois No Drawing. Application June 28, 1956
Serial No. 594,383

1 Claim. (Cl. 260—465.4)

This invention relates to a novel salt of β-aminopropionitrile and more particularly to β-aminopropionitrile fumarate and to a method of making same.

The chemical compound β-aminopropionitrile has been found to cause pathological changes in bone and tissue which closely resembles the changes identified as lathyrism, a condition caused by eating a diet high in pea meal. In other words, the compound causes a type of accelerated aging in experimental animals and has become useful as an analytical tool in studying the effect of drugs in combatting experimental lathyrism.

The chemical compound β-aminopropionitrile is notoriously unstable in its basic form and loses potency very rapidly upon standing. The hydrochloride salt of the base is more stable than the base but it suffers the great disadvantage of being extremely hygroscopic. This undesirable property limits the prospective usefulness of the chemical.

It has now been found in accordance with the practice of this invention that β-aminopropionitrile fumarate is both stable and non-hygroscopic and therefore is ideally suited for use as a test compound in creating the condition in animals which resembles lathyrism in humans. The fumarate salt of β-aminopropionitrile is a relatively high melting crystalline material as will be brought out in greater detail in the example to follow.

The following example is given in order to provide a complete disclosure of the best method of practicing the invention but the example is not intended to be a limitation on the invention in any way.

EXAMPLE

*β-Aminopropionitrile fumarate*

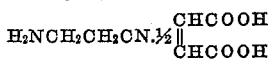

200 cc. of an 80% ethyl alcohol-water solution containing 71.4 grams (1.02 moles) of β-aminopropionitrile is added in a steady flow from a separatory funnel over a period of 2–3 minutes to 750 cc. of a warm, stirred 80% ethyl alcohol-water solution containing 59.2 grams (0.51 mole) of fumaric acid. Stirring is stopped after the addition, and the mixture is allowed to cool slowly, whereupon the product separates as a crystalline mass. After filtering and washing with cold ethyl acohol, there is obtained a crude salt. M. P. 167–168° C. Crystallization of the crude salt from 700 cc. of 80% ethyl alcohol-water mixture gives 74.7 grams of substantially pure β-aminopropionitrile fumarate melting at 172–3° C.

Calculated: N, 21.86%. Found: N, 21.90%.

The β-aminopropionitrile fumarate is used to produce experimental lathyrism by mixing a small amount with the daily ration of the species. For example, in rats one may add 0.25% to the daily ration, and in turkeys 0.03%.

Others may practice the invention in any of the numerous ways which will be suggested to one skilled in the art upon a reading of this specification. It is intended that all such practice of the invention be included hereunder provided it falls within the scope of the appended claim.

We claim:
The stable and non-hygroscopic, substantially pure salt, β-aminopropionitrile fumarate.

References Cited in the file of this patent

Terent'ev et al.: 44 C.A. (1950), p. 9349.
Marguardt et al.: 47 C.A. (1953), p. 5638.
Dasler: C.A. 1955, pp. 451, 4820, 7119.
Schilling et al.: Jour. Amer. Chem. Soc., vol. 77, pp. 2843–4, May 20, 1955.